US012124029B2

(12) United States Patent
Amirsolaimani et al.

(10) Patent No.: US 12,124,029 B2
(45) Date of Patent: Oct. 22, 2024

(54) BEAM SCANNER WITH PIC INPUT AND DISPLAY BASED THEREON

(71) Applicant: Facebook Technologies, LLC, Menlo Park, CA (US)

(72) Inventors: Babak Amirsolaimani, Redmond, WA (US); Alexander Koshelev, Redmond, WA (US); Yimin Ding, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 603 days.

(21) Appl. No.: 17/398,934

(22) Filed: Aug. 10, 2021

(65) Prior Publication Data

US 2022/0050286 A1 Feb. 17, 2022

Related U.S. Application Data

(63) Continuation-in-part of application No. 17/081,272, filed on Oct. 27, 2020, now Pat. No. 11,536,966.

(60) Provisional application No. 63/210,969, filed on Jun. 15, 2021, provisional application No. 63/066,592, filed on Aug. 17, 2020.

(51) Int. Cl.
*G02B 26/10* (2006.01)
*G02B 26/08* (2006.01)
*G02B 6/293* (2006.01)

(52) U.S. Cl.
CPC ....... *G02B 26/105* (2013.01); *G02B 26/0833* (2013.01); *G02B 6/29343* (2013.01); *G02B 6/29344* (2013.01)

(58) Field of Classification Search
CPC .............. G02B 26/105; G02B 26/0833; G02B 6/29343; G02B 6/29344
USPC ........................................................ 359/207
See application file for complete search history.

(56) References Cited

U.S. PATENT DOCUMENTS

| 6,700,552 | B2 | 3/2004 | Kollin et al. |
| 7,232,071 | B2 | 6/2007 | Lewis et al. |
| 7,558,455 | B2 | 7/2009 | Weir et al. |
| 10,056,020 | B2 | 8/2018 | Chi et al. |
| 10,168,537 | B1 | 1/2019 | Parsons |
| 2008/0073163 | A1 | 3/2008 | Weir et al. |
| 2010/0079865 | A1 | 4/2010 | Saarikko et al. |
| 2010/0201953 | A1 | 8/2010 | Freeman et al. |

(Continued)

OTHER PUBLICATIONS

"Integrated Quadratic Reflectors for High-Performance Optical Interconnects" Yu et al. https://ieeexplore.ieee.org/xpl/conhome/9252189/proceeding Sep. 28, 2020.

(Continued)

*Primary Examiner* — Joseph P Martinez
*Assistant Examiner* — Grant A Gagnon
(74) *Attorney, Agent, or Firm* — Greenberg Traurig, LLP

(57) ABSTRACT

A beam scanner and a display device is based on a photonic integrated circuit coupling light to a pair of opposed reflectors. One reflector is tiltable and has an opening through which the light is coupled, and the other reflector is configured to focus light, e.g. a concave reflector. A polarization folding configuration is used to cause the focused light propagate through the opening in the first reflector, get collimated by the second reflector, get scanned by the first reflector, and propagate through the second reflector to a pupil-replicating lightguide which provides multiple laterally offset parallel portions of the scanned beam.

20 Claims, 17 Drawing Sheets

(56) References Cited

U.S. PATENT DOCUMENTS

| | | |
|---|---|---|
| 2011/0134017 A1 | 6/2011 | Burke |
| 2014/0268174 A1 | 9/2014 | Sabry et al. |
| 2018/0052325 A1 | 2/2018 | Bohn |
| 2018/0082644 A1 | 3/2018 | Bohn |
| 2018/0120559 A1 | 5/2018 | Yeoh et al. |
| 2019/0235252 A1 | 8/2019 | Freedman et al. |

OTHER PUBLICATIONS

"Integrated waveguide-type red-green-blue beam combiners for compact projection-type displays" Nakao et al. Optics Communications 330 (2014) 45-48 May 23, 2014.

"Inverse design and demonstration of a compact and broadband on-chip wavelength demultiplexer" Piggott et al. Physics.Optics Apr. 1, 2015.

"Polarization-Insensitive Vertically Curved Si Surface Optical Coupler Bent by Ion Implantation" Yoshida et al. IEEE Photonics Technology Letters, vol. 32, No. 20, Oct. 15, 2020.

International Preliminary Report on Patentability for International Application No. PCT/US2021/046093, mailed Mar. 2, 2023, 10 pages.

International Search Report and Written Opinion for International Application No. PCT/US2021/046093, mailed Nov. 26, 2021, 12 pages.

BEAM SCANNER WITH PIC INPUT AND DISPLAY BASED THEREON

REFERENCE TO RELATED APPLICATIONS

The present application claims priority from a U.S. Provisional Patent Application No. 63/066,592 "Compact Beam Scanner" filed on Aug. 17, 2020, and from a U.S. Provisional Patent Application No. 63/210,969 "MEMS Scanner with Input Beam Provided by Photonic Integrated Circuit" filed on Jun. 15, 2021. The present application is a continuation-in-part of, and claims priority from, a U.S. Conventional patent application Ser. No. 17/081,272 "Display with a Compact Beam Scanner" filed on Oct. 27, 2020, which claims priority from U.S. Provisional Patent Application No. 63/066,592 "Compact Beam Scanner" filed on Aug. 17, 2020. All of these applications are incorporated herein by reference in their entireties.

TECHNICAL FIELD

The present disclosure relates to image projectors, visual displays including near-eye displays, and related methods.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, are intended for multiple users, and some visual display systems, such s near-eye displays or NEDs, are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Head-mounted display devices require compact and efficient projectors that render an image in angular domain by scanning an optical beam.

BRIEF DESCRIPTION OF THE DRAWINGS

Exemplary embodiments will now be described in conjunction with the drawings, in which.

DETAILED DESCRIPTION

Figure 1:
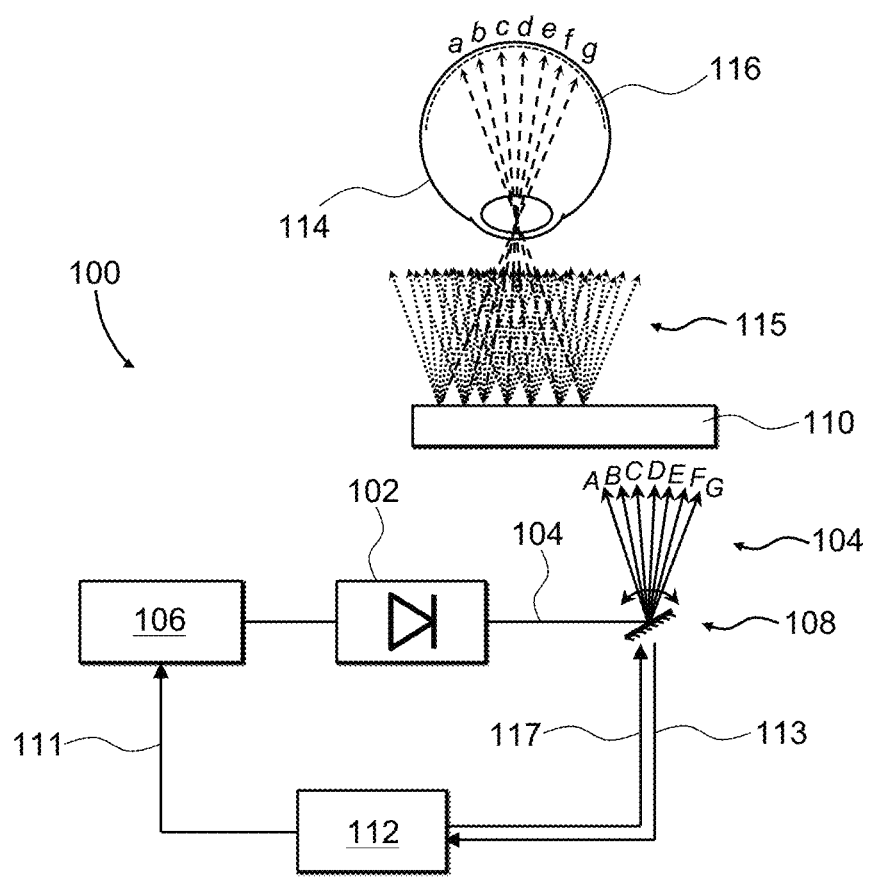
FIG. 1 is a schematic view of a near-eye display based on a scanning image projector.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A scanning projector display may use a tiltable mirror to angularly scan an intensity-modulated light beam about one or two axes. As the light beam is scanned, its brightness and/or color may vary in coordination with the scanning, to provide an image in angular domain. The light beam may be scanned in two directions, e.g. over X- and Y-viewing angles. When the frame rate is high enough, the eye integrates the scanned light beam, enabling the user to see the displayed imagery substantially without flicker. The scanner may be capable of scanning a light beam over the entire field of view (FOV) of the display. The FOV may be defined as a solid angle in which image light may be provided to a viewer.

A relay lightguide may be provided to relay the image in angular domain to an eyebox of the display. The relay lightguide may be configured to provide pupil replication of the relayed light to expand the light over an eyebox of the display. Such a lightguide is referred to as a pupil-replicating lightguide. The pupil-replicating lightguide provides multiple offset portions of the beam having a same angle and the scanned input beam. When an eye is placed behind the pupil-replicating lightguide, the eye can see the rastered image directly, i.e. without an ocular lens, resulting in a compact and lightweight overall display construction.

It is desirable to bring the scanning mirror closer to the pupil-replicating lightguide to minimize the beam walk-off on an input coupler of the pupil-replicating lightguide. Furthermore, a near-normal incidence of the light beam at the tiltable mirror is required to make the most use of the angular scanning range of the tiltable mirror. To accommodate both of these requirements, the light beam may be directed propagate through the pupil-replicating lightguide before impinging onto the tiltable mirror. Propagating a collimated light beam through the pupil-replicating lightguide is undesirable because it causes a bright point artifact in the image in angular domain being generated.

In this disclosure, a scanning projector configuration is presented that is free from the above limitations. A small opening in the tiltable mirror is provided, and the intensity-modulated light beam is focused through the opening to impinge onto a fixed concave mirror, which collimates the light beam upon reflection, redirecting the beam back to the tiltable mirror which angularly scans the beam. A polarization configuration may be employed to propagate the scanned beam through the curved mirror on the second pass causing the light beam to propagate to the pupil-replicating lightguide. A photonic integrated circuit (PIC) is used to bring the focused light beam to the opening in the tiltable mirror. The PIC may convey light from a multiple light sources, and may combine light of different color channels to the opening in the tiltable mirror as described herein.

In accordance with the present disclosure, there is provided a beam scanner comprising a photonic integrated circuit (PIC) comprising a first waveguide for guiding a first light beam, and first and second opposed reflectors. The first reflector is tiltable upon application of a control signal and has an opening therein for receiving the first light beam out-coupled from the first waveguide. The second reflector is configured to at least partially reflect the first light beam back towards the first reflector after the first light beam propagated through the opening in the first reflector, thereby forming a first collimated beam to be reflected by the first reflector at a variable angle towards the second reflector. The second reflector is configured to propagate therethrough at least a portion of the first collimated beam reflected by the first reflector.

In some embodiments, the first reflector comprises a microelectromechanical system (MEMS) tiltable reflector. A quarter-wave plate (QWP) may be disposed in an optical path between the first and second reflectors for converting a first linear polarization of the first light beam into a second, orthogonal linear polarization of the first collimated beam. The second reflector may be polarization-selective. A coupling lens may be disposed in an optical path between the PIC and the opening in the first reflector for focusing the first light beam through the opening.

In some embodiments, the PIC comprises an out-coupler for out-coupling the first light beam from the waveguide. The out-coupler may include a turning mirror for redirecting the first light beam out of a plane of the PIC. The turning mirror may be concave for focusing the light beam through the opening in the first reflector. The beam scanner may further include an auxiliary waveguide extending from the PIC towards the opening in the first reflector for conveying the first light beam reflected by the turning mirror to the opening in the first reflector. The PIC may further include a second waveguide for guiding a second light beam, where the second light beam out-coupled from the second waveguide is coupled into the opening in the first reflector. The second reflector may be configured to at least partially reflect the second light beam back towards the first reflector after the second light beam propagated through the opening in the first reflector, thereby forming a second collimated beam to be reflected by the first reflector at a variable angle towards the second reflector. The second reflector may be configured to propagate therethrough at least a portion of the second collimated beam reflected by the first reflector.

In some embodiments, the PIC further comprises a combiner element for optically coupling a plurality of light sources at different wavelengths into the first waveguide. The combiner element may include a multimode interference (MMI) coupler for combining light beams emitted by the plurality of light sources. The combiner element may include a plurality of ring resonators, each ring resonator of the plurality of ring resonators optically coupling a light source of the plurality of light sources to the waveguide, or a plurality of directional couplers, each directional coupler of the plurality of directional couplers optically coupling a particular light source of the plurality of light sources to the waveguide. The combiner element may include a cavity having coupled thereto a plurality of input waveguides and an output waveguide, each input waveguide of the plurality of input waveguides optically coupling a light source of the plurality of light sources to the cavity. The cavity may include a nanostructure providing a non-uniform spatial distribution of effective dielectric permittivity optimized for coupling light emitted by each light source to the output waveguide of the combiner element.

In accordance with the present disclosure, there is provided a display device comprising a first light source for emitting a first light beam, a PIC described herein, and a pupil-replicating lightguide. The pupil-replicating lightguide is configured to in-couple the collimated beam propagated through the second reflector, and to out-couple, at an out-coupling angle, portions of the collimated beam, wherein the portions are offset along a length dimension of an eyebox of the display device.

The pupil-replicating lightguide may include an in-coupling grating for in-coupling the collimated beam, and an out-coupling grating for out-coupling the portions of the collimated beam along the length dimension of the eyebox. The display device may further include a controller operably coupled to the first light source and the first reflector and configured to control a brightness of the first light source in coordination with applying the control signal to the first reflector for scanning the collimated beam portions to form an image in angular domain at the eyebox. In embodiments where the display device includes a second light source for emitting a second light beam at a different wavelength than the first light beam, the PIC may further include combiner element for optically coupling the first and second light beams into the first waveguide.

In accordance with the present disclosure, there is further provided a method for scanning a light beam. The method includes guiding the light beam in a waveguide of a photonic integrated circuit (PIC), through an opening in a first reflector, and to a second reflector opposite the first reflector, wherein the first reflector is tiltable upon application of a control signal; at least partially reflecting the light beam propagated through the opening towards the first reflector, thereby forming a collimated beam; reflecting the collimated beam by the first reflector at a variable angle back towards the second reflector; propagating at least a portion of the collimated beam reflected by the first reflector through the second reflector; and applying the control signal to the first reflector to tilt the first reflector, thereby angularly scanning the collimated beam propagated through the second reflector.

In some embodiments, the method includes using a coupling lens to couple the light beam guided by the waveguide of the PIC to the opening in the first reflector. In embodiments where the second reflector is polarization-selective, the method may further include converting polarization of the light beam on an optical path between first and second incidences of the light beam onto the second reflector from a first polarization state, at which the light beam is reflected by the second reflector, to a second polarization state, at which the light beam is propagated through the second reflector.

Referring now to FIG. 1, a display device 100 includes a light source 102 for providing a light beam 104. An electronic driver 106 is operably coupled to the light source 102 for powering the light source 102. A beam scanner 108 including a tiltable reflector, e.g. a microelectromechanical (MEMS) tiltable reflector, is optically coupled to the light source 102 for scanning the light beam 104 generated by the light source 102. The scanning may be performed in one or two dimensions, e.g. about an X-axis and/or Y-axis perpendicular to the X-axis, where X- and Y-axes are in plane of the MEMS reflector at its normal i.e. unpowered position. A pupil replicator 110 provides a light field 115 including multiple laterally shifted parallel portions of the scanned light beam 104, which repeat the beam angle, i.e. a direction of propagation of the light beam 104 at every moment of time as the light beam 104 is scanned about one or two axes, as the case may be.

A controller 112 is operably coupled to the beam scanner 108 and the electronic driver 106. The controller 112 is configured for operating the electronic driver 106 for powering the light source 102 in coordination with driving the beam scanner 108 and reading its position. For example, the controller 112 may apply a control signal 113 to cause the beam scanner 108 to scan the light beam 104 through a succession of beam angles or directions "A" through "G", while applying a power signal 111 to cause the electronic driver 106 to change the brightness of the light source 102 in accordance with an image to be displayed, thus forming an image in angular domain for direct observation by a viewer's eye 114. A feedback circuit may provide a feedback signal 117 to indicate the current MEMS mirror position to the controller 112.

The pupil replicator 110 provides multiple laterally displaced parallel portions of the scanned light beam 104 in directions "A" through "G", as illustrated. The viewer's eye 114 receives the light field 115, and forms an image at the eye's retina 116 from the corresponding replicated light beams, as shown. A linear position of the beam portions on the eye's retina 116 is denoted with letters "a" through "g", and corresponds to the beam angles or directions "A" through "G" of the scanned light beam 104. In this manner, the eye 114 forms an image in linear domain on the eye's retina 116 from the image in the angular domain formed by the light field 115.

One challenge associated with the display device 100 is a reduction of the FOV caused by an oblique angle of incidence of the light beam onto a slanted tiltable reflector of the beam scanner 108. The oblique angle may be required by the optical geometry used, e.g. to physically separate an impinging light beam from the scanned, i.e. reflected, light beam. The FOV reduction is caused by distortion of the solid angle representing the range of scanning at oblique angles of incidence of light beam at the tiltable reflector.

A beam scanner of this disclosure includes a tiltable reflector having an opening, and a curved reflector disposed opposite the scanning reflector to reflect light transmitted through the opening back toward the scanning reflector. Such a configuration is free from the above drawbacks in that it enables a near-normal incidence of the light beam on the tiltable reflector, and a near-parallel positioning of the tiltable reflector w.r.t. the beam replicator.

Figure 2A:
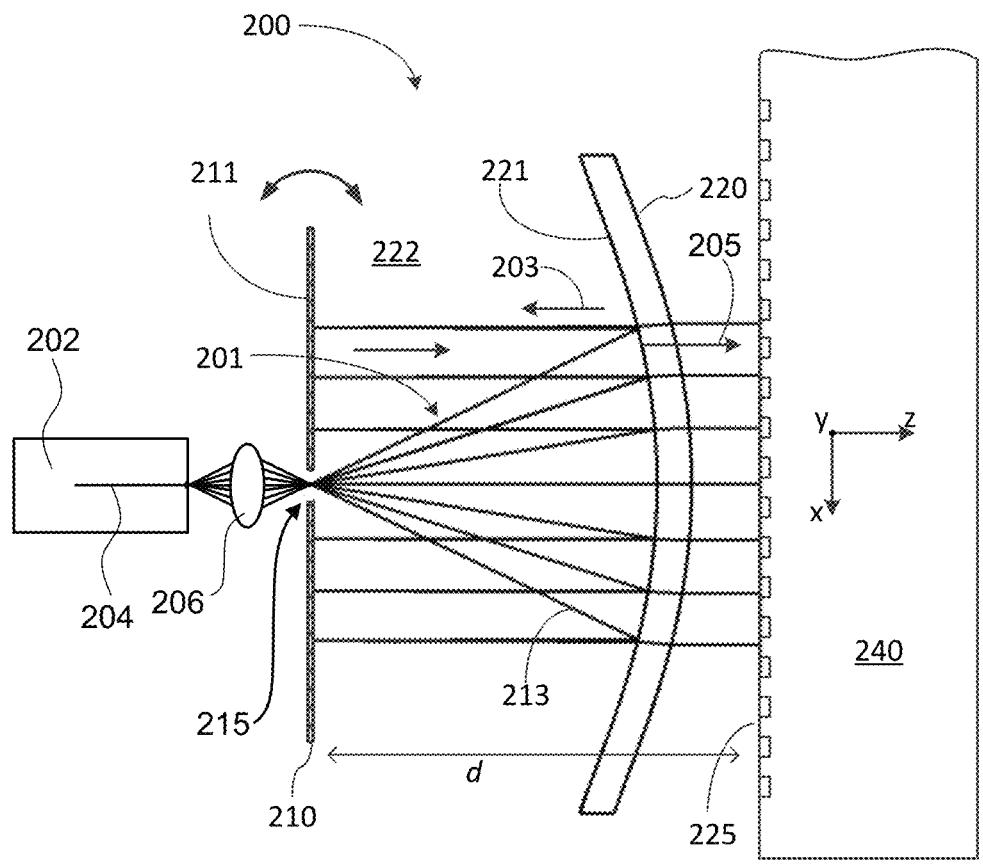
FIG. 2A is a schematic cross-sectional view of a compact scanning projector of this disclosure with a tiltable reflector in a non-tilted position.

Referring to FIG. 2A, a beam scanner 200 may be used in the display device 100 of FIG. 1 as a scanner with near-normal angle of incidence of the light beam on the scanner's reflector. The beam scanner 200 of FIG. 2 includes a photonic integrated circuit (PIC) 202 having a waveguide 204 for guiding a light beam 201 towards a first reflector 210. The first reflector 210 is tiltable by a controlled amount upon application of a control signal. The first reflector 210 may be tiltable about one axis or two non-parallel axes, and may include e.g. a microelectromechanical system (MEMS) tiltable reflector. A second reflector 220 is disposed opposite the first reflector 210.

In operation, the light beam 201 is out-coupled from the waveguide 204 of the PIC 202 and is re-focused by an optional relay lens 206 into an opening 215 in the first reflector 210 from a rear side 211 of the first reflector 210. Upon propagation through the opening 215, the light beam 201 diverges as indicated with rays 213. The second reflector 220 is configured to at least partially reflect the light beam 201 back towards the first reflector 210 and to collimate the light beam 201, forming a collimated light beam 203 propagating towards the first reflector 210. For example, the second reflector 220 may be concave as shown in FIG. 2A, the second reflector 220 may be e.g. of a parabolic shape.

The collimated light beam 203 is reflected by the first reflector 210 back towards the second reflector 220 at an angle depending on the angle of tilt of the first reflector 210. At least a portion of the doubly reflected beam, herein termed a scanned beam 205, propagates through the second reflector 220 and impinges onto an input coupler 225 of a pupil-replicating lightguide 240. The input coupler 225 may include one or more diffraction gratings configured to in-couple the scanned beam 205 into the pupil-replicating lightguide 240. The optical losses in the beam scanner 200 are small because an area of the opening 215 is much less than a reflective area of the entire first reflector 210. For example, the area of the opening may be 20% to 0.001% of the reflective area of the first reflector 210.

The light beam 201 travels in a cavity 222 between the first 210 and second 220 reflectors along an optical path that may be folded using polarization elements. For example, a coating 221 of the second reflector 220 may be polarization-selective, and the folded optical path may include an optical element, not shown in FIGS. 2A and 2B for brevity, that transforms the polarization state of the light beam 201 from a first state, the light of which is being reflected by the polarization-selective coating 221, to a second state, the light of which is being transmitted by the polarization-selective coating 221. Non-limiting examples of polarization configurations for folding of the beam path in the beam scanner 200 are omitted from FIGS. 2A-2C and will be considered further below with reference to FIGS. 4A and 4B.

The second reflector 220 may be disposed suitably close to the first reflector 210, so that a distance d between the first reflector 210 and the pupil-replicating lightguide 240 is small. This distance may depend on the size of the first reflector 210 and angular range of its tilt. By way of example, the first reflector 210 may be as close as 1 mm or less to the pupil-replicating lightguide 240.

Figure 2B:
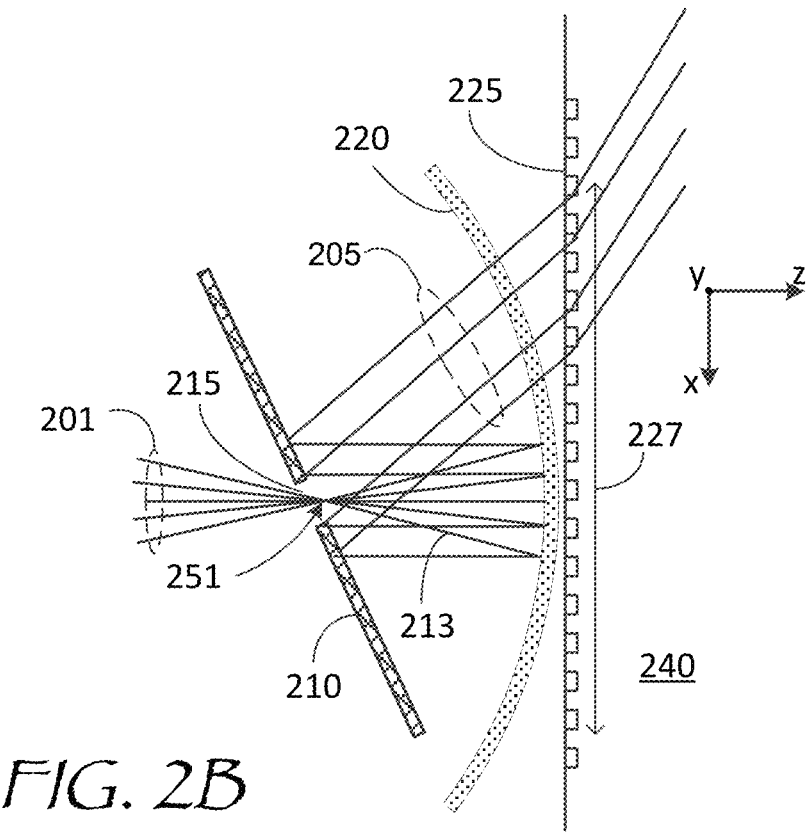
FIG. 2B is a schematic cross-sectional view of the scanning projector FIG. 2A with the tiltable reflector in a tilted position.

With reference to FIG. 2B, the first reflector 210 is shown tilted to reflect the scanned beam 205 at an oblique angle. The opening 215 should be large enough to accommodate a waist 251 of the focused light beam 201. The opening 215 may be tapered from one or both sides to facilitate the light beam propagation. An area 227 of the input coupler 225 is wide enough to couple the scanned beam 205 into the pupil-replicating lightguide 240. The area 227 is relatively small due to close proximity of the first reflector 210 to the pupil-replicating lightguide 240.

Figure 2C:
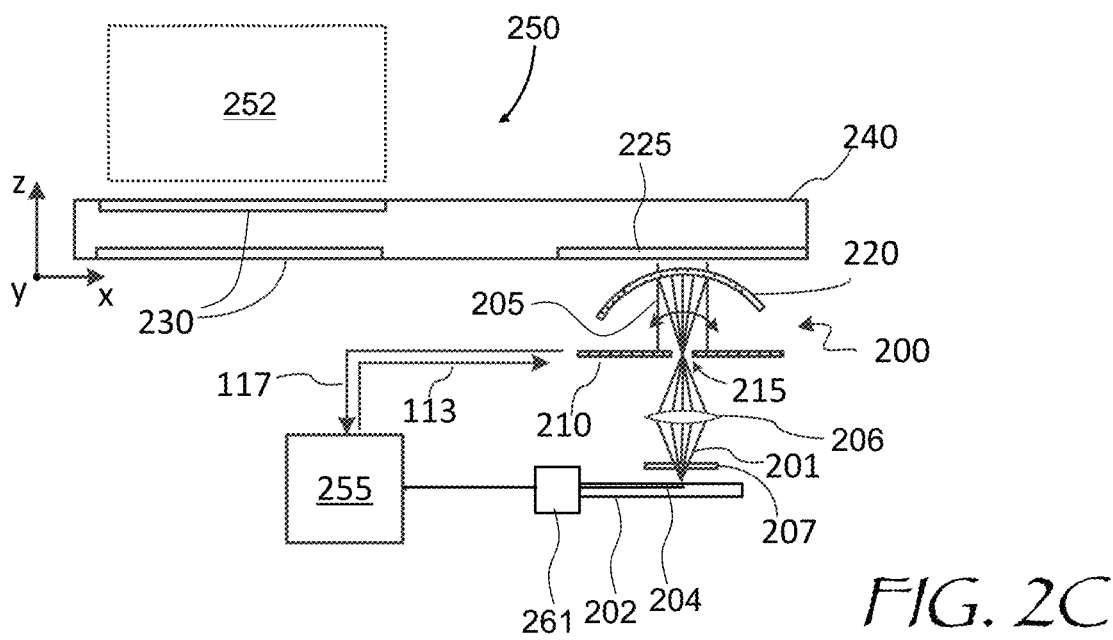
FIG. 2C is a schematic cross-sectional view of a near-eye display based on the scanning projector of FIGS. 2A and 2B.

Referring to FIG. 2C, a display device 250 uses the beam scanner 200 of FIGS. 2A and 2B. The display device 250 of FIG. 2C includes a light source 261 for emitting the light beam 201, the PIC 202 coupled to the light source 261, the first 210 and second 220 opposed reflectors, and the pupil-replicating lightguide 240. The first reflector 210 is tiltable upon application of the control signal 113 and has an opening 215 through the first reflector 210 for receiving the light beam 201 out-coupled from the waveguide 204. The opening 215 may include a transparent material, and may be tapered to better accommodate focused light beams and the tilting of the first reflector 210. The second reflector 220 is configured to reflect the light beam 201 back towards the first reflector 210 after the light beam 201 propagated through the opening 215 in the first reflector 210, thereby forming a collimated beam which is reflected by the first reflector 210 at a variable angle towards the second reflector 220, forming the scanned beam 205. At least a portion of the scanned beam 205 propagates through the second reflector 220 and impinges onto the input coupler 225 of the pupil-replicating lightguide 240. The input coupler 225 of the pupil-replicating lightguide 240 is configured to in-couple the scanned beam 205 propagated through the second reflector 220. The pupil-replicating lightguide 240 may further include at least one out-coupling grating 230 (two are shown in FIG. 2C) for out-coupling portions of the scanned beam 205. The portions are offset along a length dimension, i.e. X-dimension in FIG. 2C, of an eyebox 252 of the display device 250.

A controller 255 may be operably coupled to the light source 261 and the first reflector 210 and configured to control at least one of a brightness or color of the light source 261 in coordination with applying the control signal 113 to the first reflector 210 for scanning the collimated beam portions out-coupled by the out-coupling grating (s) 230 of the pupil-replicating lightguide 240 to form an image in angular domain at the eyebox of the display device 250. The feedback signal 117 may be used by the controller 255 to obtain information about current tilting angle of the tiltable reflector 210. The feedback signal 117 may include, for example, temporal sampling of the X and Y angular position of the first reflector 210, sync signals at specific pre-determined tilt angles of the first reflector 210, etc. The light source 261 may include one or more emitters, which may be based on solid-state single-mode or multimode light sources such as a light-emitting diode (LED), a superluminescent light-emitting diode (SLED), a side-emitting laser diode, a vertical-cavity surface-emitting laser diode (VCSEL), etc.

Figure 3:
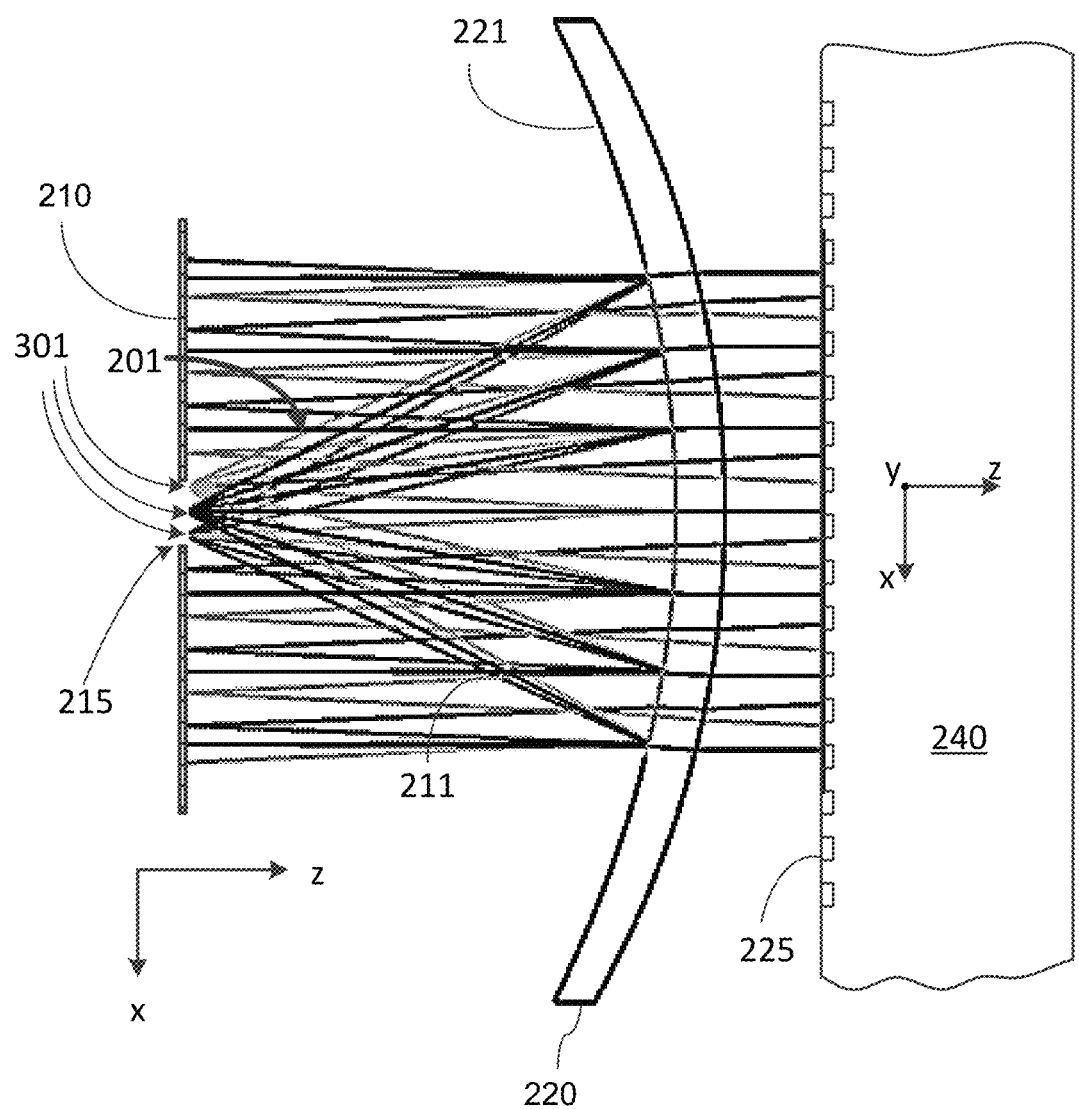
FIG. 3 is a schematic cross-sectional view of a compact scanning projector with several light inputs.

Multi-emitter light sources provide multiple light beams of a same color or different colors, which are focused into a plurality of focal spots located proximate one another. For example, referring to FIG. 3, focal spots 301 are disposed within the common opening 215 in the first reflector 210. The multiple focal spots 301 may support different colors of a color image, and/or may provide enhanced image resolution in a scanning projector based display by using different emitters for different pixels or different groups of pixels of the image being displayed.

Figure 4A:
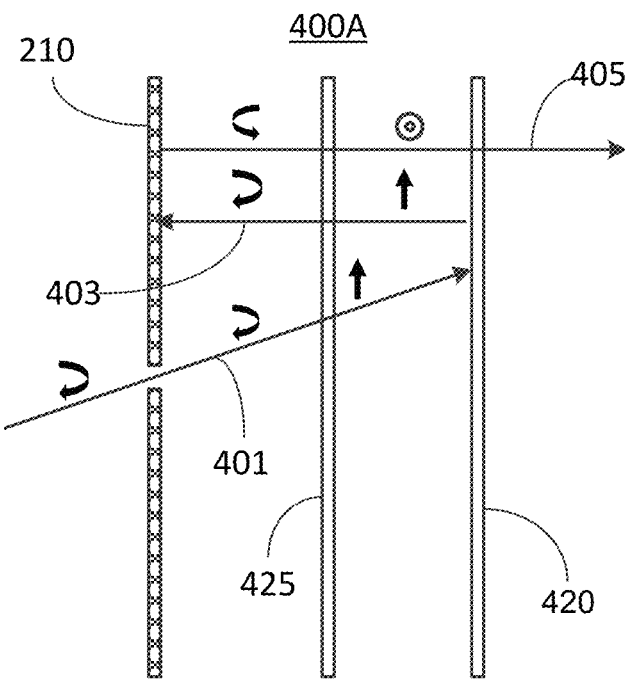
FIG. 4A is a polarization diagram for a scanning projector embodiment with a linear polarization selective reflector.

Polarization-based beam folding configurations of the beam scanner 200 will now be considered. Referring first to FIG. 4A, a beam scanner 400A includes the first (tiltable) reflector 210 and a second (collimating) reflector including a reflecting polarizer 420 facing the first reflector. In the illustrated example, the reflecting polarizer 420 is a linear reflecting polarizer configured to reflect p-polarized light polarized in plane of FIG. 4A, and to transmit s-polarized light polarized perpendicular to the plane of FIG. 4A. The reflecting polarizer 420 may be implemented as a coating on the second reflector 220 of the beam scanner 200 of FIGS. 2A and 2B. A ray 401 of the converging/diverging light beam 201 is circularly-polarized. A suitably oriented quarter-wave plate (QWP) 425 disposed in an optical path between the first reflector 210 and the reflecting polarizer 420 converts a polarization state of the ray 401 into p-polarization state, which is reflected back by the reflecting polarizer 420 forming a reflected ray 403. The propagation of the reflected ray 403 through the QWP 425 converts the p-polarization state back to a circular polarization state. The reflection from the first reflector 210 flips the circular polarization state of a scanned ray 405 of the scanned light beam 205 to an orthogonal circular polarization. A third pass through the QWP 425 converts the orthogonal circular polarization state to the linear s-polarization state. At this polarization state, the scanned ray 405 is transmitted through the linear reflecting polarizer 420. In another embodiment, the reflecting polarizer BR 420 may be configured to reflect s-polarized light and transmit p-polarized light, with corresponding changes to the QWP 425 orientation and the polarization of the input ray 401. The QWP 425 may be positioned anywhere between the SR 210 and the BR 420; in some embodiments it may be laminated upon the reflecting polarizer 420 facing the first reflector 210, or upon the first reflector 210 facing the reflecting polarizer 420.

Figure 4B:
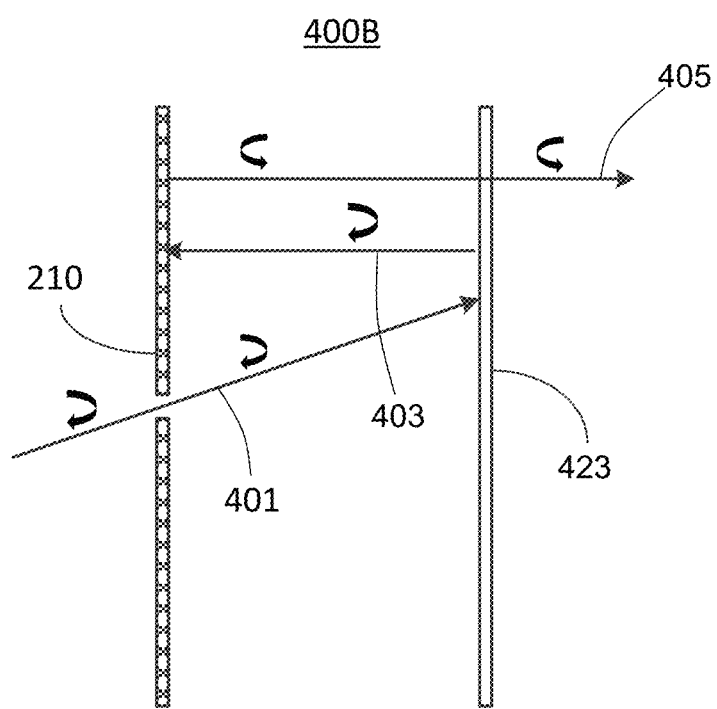
FIG. 4B is a polarization diagram for a scanning projector embodiment with a circular polarization selective reflector.

Turning to FIG. 4B, a beam scanner 400B includes the first (tiltable) reflector 210 opposite a second (collimating) reflector including a cholesteric liquid crystal (ChLC) polarizer 423. The ChLC polarizer 423 may be configured to reflect circular polarized light having a same helicity as the ChLC material, and to transmit circular polarized light of the opposite helicity. In the illustrated example, the ChLC polarizer 423 is configured to reflect circularly polarized input ray 401, forming the reflected ray 403. The reflection from the first reflector 210 flips the circular polarization to the orthogonal circular polarization of the scanned ray 405, which is then transmitted through the ChLC polarizer 423. Thus, a QWP between the first reflector 210 and the ChLC polarizer 423 is not required in the embodiment of FIG. 4B. Although in FIGS. 4A and 4B the right-side reflectors 420, 423 are shown schematically as flat, they may have concave reflective faces facing the first reflector, as described above.

In any of the embodiments described herein, the first reflector 210 may include a MEMS tiltable reflector. By way of a non-limiting illustrative example, a MEMS scanner 500 of FIG. 5 includes a reflector 510 tiltable about two orthogonal axes. The tiltable reflector 510, e.g. a mirror or a diffraction grating, may be supported by a pair of first torsional hinges 501 allowing tilting the reflector 510 about X axis. The first torsional hinges 501 extend from the tiltable reflector 510 to a gimbal ring 520, which is supported by a pair of second torsional hinges 502 extending from the gimbal ring 520 to a fixed base 522 or an optional second gimbal ring in-between, for tilting of the gimbal ring 520 together with the reflector 510 about Y axis. The fixed base 522 may be supported by a substrate 555. Actuators may be disposed underneath the tiltable reflector 510 and or the gimbal ring 520 for providing a force for actuating the tilt of the reflector 510 about X and Y axes. The actuators may be electrostatic, electro-magnetic, piezo-electric, etc. For electrostatic mirror actuation, a comb drive may be located on the torsional hinges. For example, one actuator (not shown) may be disposed under an edge of the reflector 510 to tilt the reflector 510 about X-axis, while another actuator (not shown) may be disposed under the gimbal ring 520 for tilting the gimbal ring 520 together with the reflector 510 about Y-axis.

Figure 5:
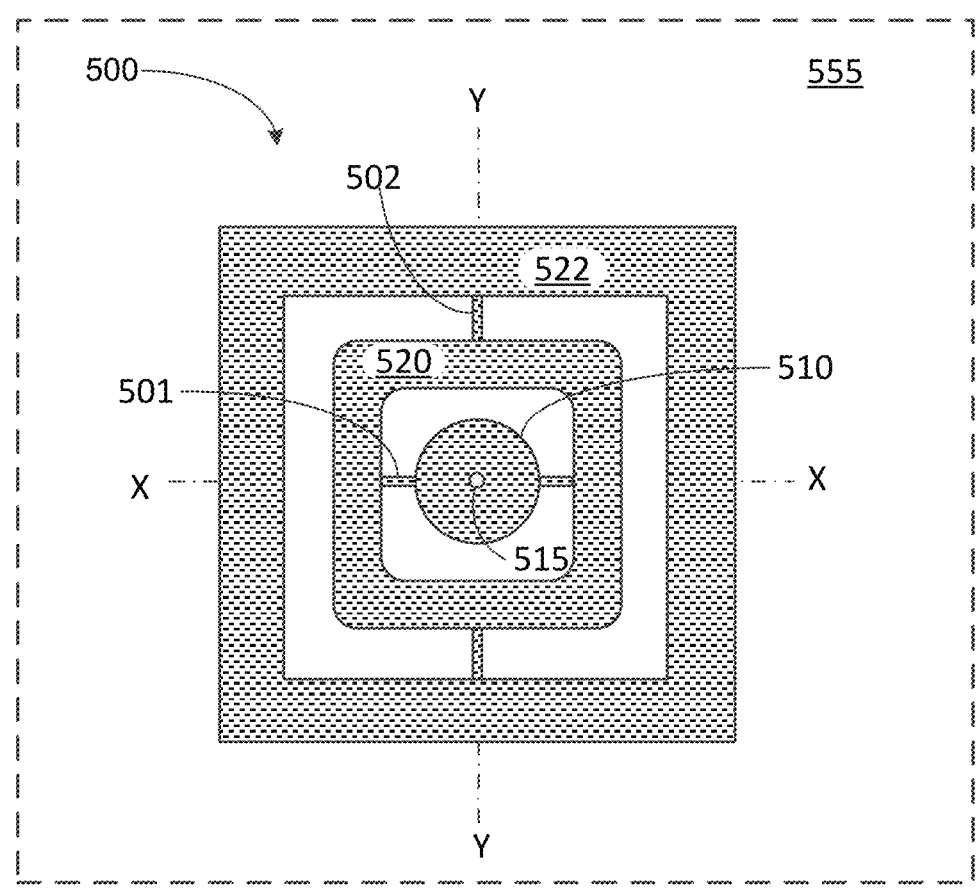
FIG. 5 is a plan view of a 2D tiltable reflector of this disclosure.

The reflector 510 may have an opening 515 to allow input light beam to propagate through the reflector 510. The opening 515 may be for example a through opening or a hole in a middle portion of the tiltable reflector 510, so that the tiltable reflector 510 has a doughnut-like shape. The opening 515 may be filled with a transparent material. In at least some embodiments, the opening 515 may be located at the center of the tiltable reflector 510 at the intersection of the tilt axes, denoted X and Y in FIG. 5, so its location remains stationary during tilting. An off-center location of the opening 515 is also within the scope of the present disclosure. Although the opening 515 is shown to have a circular shape, apertures of different shapes may be used, including but not limited to square, rectangular, slit-shaped, or generally any other shape as suitable in particular embodiments. By way of a non-limiting example, the tiltable reflector 510 may be a circular mirror having a diameter of 1.5 mm, and the opening 515 may have a diameter 0.005-0.2 mm. Although FIG. 5 illustrates a gimbaled reflector, gimbal-less tilting reflectors with an opening, including gimbal-less MEMS reflectors may also be used to implement SR 210. In some embodiments, ring-shaped stiffening structures may be provided at the back side of the tiltable reflector 510.

Figure 6A:
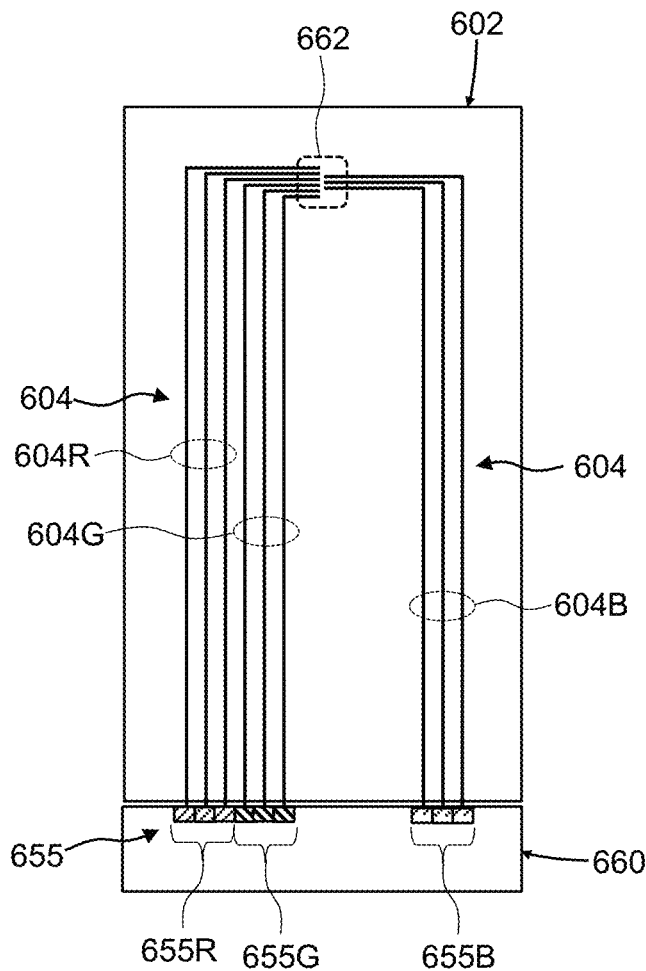
FIG. 6A is a plan view of a photonic integrated circuit (PIC) coupler for the scanning projector of FIGS. 2A and 2B.
Figure 6B:
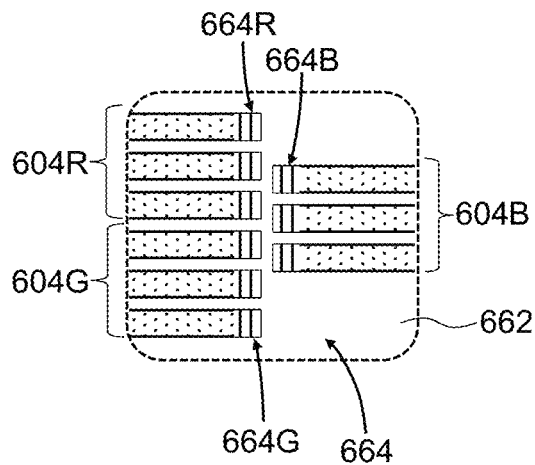
FIG. 6B is a magnified view of the PIC coupler of FIG. 6A.
Figure 6C:
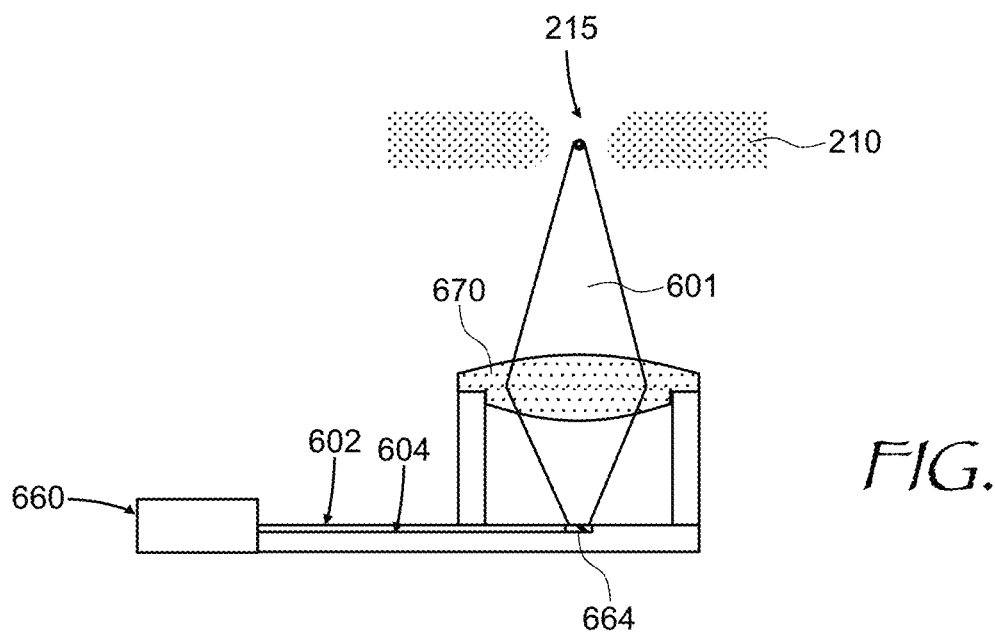
FIG. 6C is a side cross-sectional view of the PIC coupler of FIG. 6A with a coupling lens.

Example configurations of PIC delivering the light to the opening of a tiltable reflector of this disclosure will now be considered. Referring to FIG. 6A, a PIC 602 includes a plurality of waveguides 604 each optically coupled to an individual emitter 655 of a multi-emitter light source 660. The waveguides 604 all lead to an out-coupling area 662 of the PIC 602, which is shown in more detail in FIG. 6B. Each waveguide 604 ends with a grating out-coupler 664 that out-couples light propagating in the waveguide 604 from the PIC 602. The out-coupling area 662 is disposed in a focal plane of a coupling lens 670 shown in FIG. 6C. The coupling lens 670 is disposed in an optical path between the PIC 602 and the opening 215 in the first reflector 210 for focusing light beams 601 out-coupled by individual grating out-coupler 664 through the opening 215 in the first (i.e. tiltable) reflector 210. The opening 215 may be tapered as shown. The grating out-couplers 664 are disposed close together to make sure that focal spots of the focused light beams 601 are disposed close to one another and all fit into the opening 215.

The different emitters 655 may emit light at wavelengths of a same color channel, or at wavelengths of different color channels. When the emission wavelengths of different emitters 655 belong to a same color channel, or to a luminance channel for monochrome images, the spatial resolution of a scanning display device based on the PIC 602 may be increased by projecting several pixels of the image simultaneously at any instantaneous angle of tilt of the first reflector 210. When the emission wavelengths of different emitters 655 belong to different color channels, a color image may be produced. In the embodiment shown in FIGS. 6A and 6B, the total of none emitters 655 belong to three different groups: three emitters 655R provide light of a red color channel, three emitters 655G provide light of a green color channel, and three emitters 655B provide light of a blue color channel. Accordingly, three waveguides 604R carry the light of the red color channel, three waveguides 604G carry the light of the green color channel, three waveguides 604B carry the light of the blue color channel. Three out-couplers 664R out-couple the light of the red color channel, three out-couplers 664G out-couple the light of the green color channel, and three out-couplers 664B out-couple the light of the blue color channel. The actual number of emitters per channel may vary from one emitter and one waveguide to many (e.g. 18 or more) emitters and waveguides.

The coupling lens 670 re-focuses light beams 601 of all color channels through the opening 215, which may be tapered on one side, or both sides as shown. The light beams 601 of all color channels then propagate as explained above with reference to FIGS. 2A to 2C, FIG. 3, and FIGS. 4A and 4B. The second reflector is configured to at least partially reflect the light beams 601 of all color channels back towards the first reflector after the light beams 601 propagated through the opening 215 in a first reflector 210, thereby forming a collimated beam to be reflected by the first reflector 210 at a variable angle towards the second reflector 220 (FIGS. 2A to 2C). The second reflector 220 is configured to transmit through at least a portion of each collimated beam reflected by the first reflector 210. The co-propagation of multiple beams has been illustrated above with reference to FIG. 3.

Figure 6D:
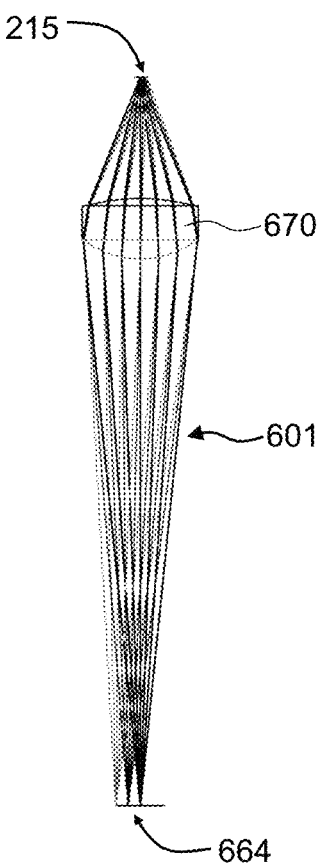
FIG. 6D is an optical raytrace diagram illustrating light ray propagation through the coupling lens of FIG. 6C.

The exact number of co-propagating collimated beams corresponds to the number of emitters used. There may be one, two, or more emitters and beams, of a same or different color channels, a luminance channel, etc. The co-scanned collimated beams emitted by different emitters will have slightly different angles of propagation, but this difference can be accounted by the controller controlling the timing of all the emitters and the scanning mirror (i.e. the first reflector 210). A rendering of the coupling lens 670 in optical design software is shown in FIG. 6D for the case of three light beams out-coupled by three adjacent grating out-couplers 664.

Figure 7A:
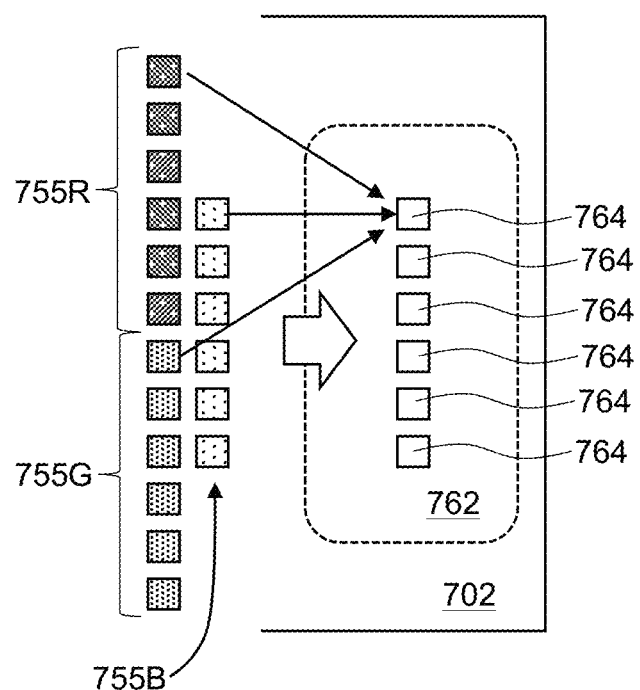
FIG. 7A is a schematic view of an multi-wavelength emitter and PIC configuration with wavelength-division multiplexing.

In some embodiments, light of different color channels may be combined for propagation in a same waveguide of the PIC, resulting in a more compact and efficient overall configuration. Referring to FIG. 7A for a non-limiting example, an out-coupling area 762 of a PIC 702 includes six out-couplers 764, each out-coupler 764 out-coupling a combined light beam including light of a red color channel emitter 755R, a green color channel emitter 755G, and a blue color channel emitter 755B. The combination is schematically represented by thin black arrows in FIG. 7A. The combining function may be provided by a wavelength-division multiplexer element for each out-coupler 764. This results in a more compact overall configuration, and/or enables more out-coupled color channel light beams, as compared to FIG. 6B for example, where individual color channels are not multiplexed.

Figure 7B:
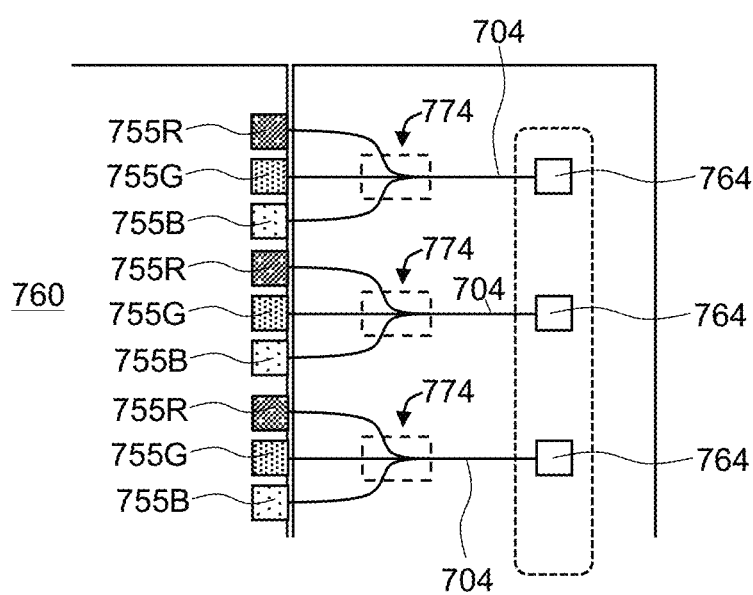
FIG. 7B is a schematic top view of a PIC with wavelength-division multiplexing of individual emitters into common waveguides.

Turning to FIG. 7B, a multi-emitter light source 760 includes the red color channel emitters 755R, the green color channel emitters 755G, and blue color channel emitters 755B. Only three emitters of each color channel are shown for brevity. The multi-emitter light source 760 is optically coupled to the PIC 702, which includes a plurality of combiner elements 774, one combiner element 774 per a triad of the red 755R, green 755G, and blue 755B emitters. Each combiner element 774 optically couples the corresponding red 755R, green 755G, and blue 755B emitter into a common waveguide 704 that ends with the corresponding out-coupler 764. At least one combiner element 774, waveguide 704, and out-coupler 764 may be provided.

Figure 8A:
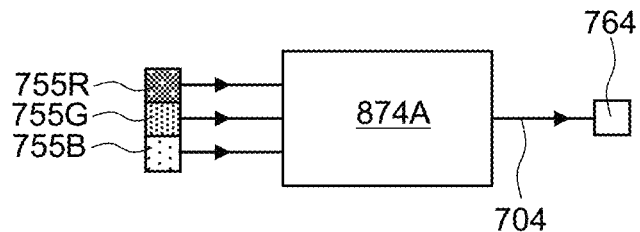
FIG. 8A is a schematic view of a multimode interference (MMI) coupler for combining light sources of different wavelengths.

Example configurations of the combiner element 774 will now be considered. Referring to FIG. 8A, a multimode interference (MMI) coupler 874A combines light beams of the red 755R, green 755G, and blue 755B emitters for propagation in a common waveguide 704 that guides the combined light to the out-coupler 764. The MMI coupler 874A is configured to excite several modes of propagation within the MMI coupler 874A such that, for light of each of the red, green, and blue color channels emitted by corresponding red 755R, green 755G, and blue 755B emitters, a maximum of intermodal interference coincides with the position of the tip of the waveguide 704 in the MMI coupler 874A.

Figure 8B:
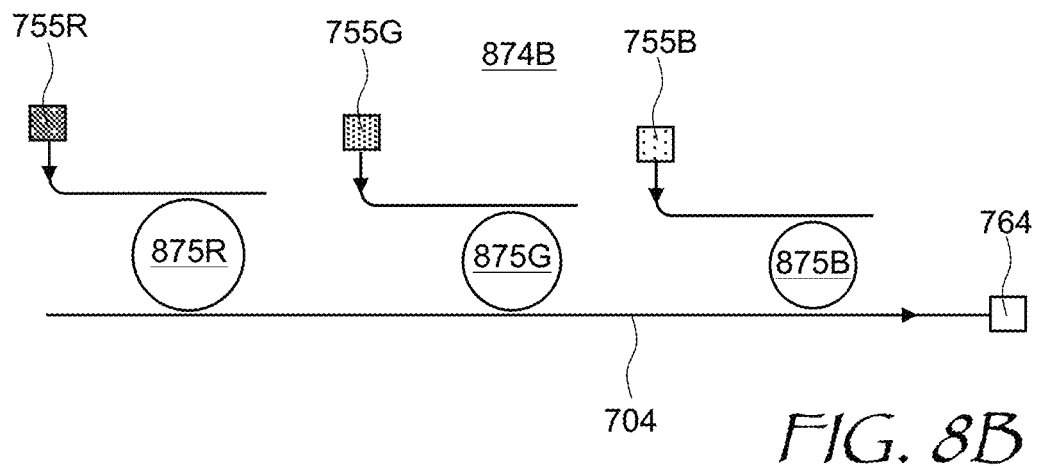
FIG. 8B is a schematic view of a ring resonator based coupler for combining light sources of different wavelengths.

Turning to FIG. 8B, a ring combiner element 874B includes a plurality of ring resonators 875R, 875G, and 875B, each ring resonator 875R, 875G, and 875B optically coupling light of a particular one of the red 755R, green 755G, and blue 755B emitters, respectively, to the common waveguide 704 guiding light to the out-coupler 764. Each ring resonator 875R, 875G, and 875B is configured to in-couple and out-couple the light of a particular one of the red 755R, green 755G, and blue 755B emitters with high efficiency while not in-coupling or out-coupling the light of the other emitters.

Figure 8C:
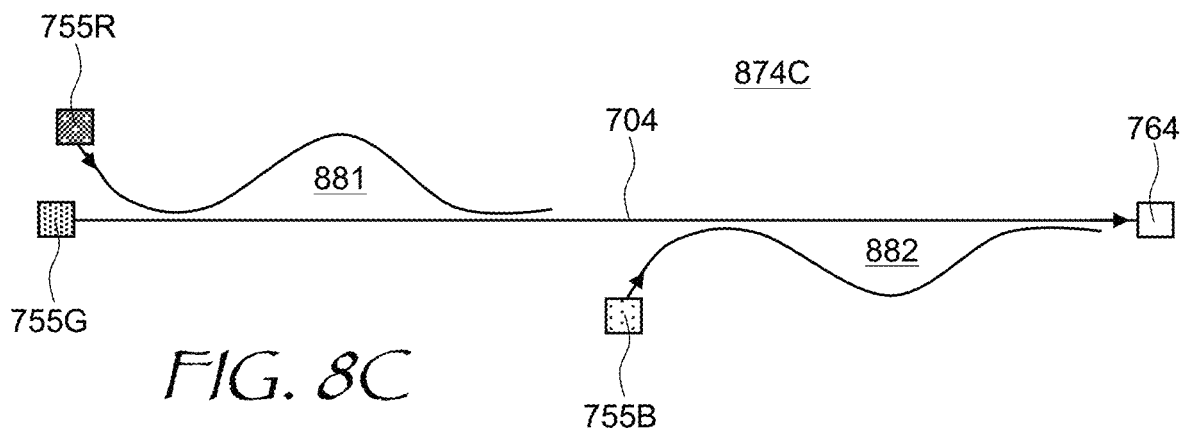
FIG. 8C is a schematic view of a compound directional coupler for combining light sources of different wavelengths.

Referring now to FIG. 8C, a directional coupler combiner element 874C includes directional couplers 881, 882 formed with the common waveguide 704. In the non-limiting embodiment shown in FIG. 8C, the first directional coupler 881 is coupled to the red emitter 755R, the second directional coupler 882 is coupled to the blue emitter 755B, and the common waveguide 704 is coupled to the green emitter 755G.

Figure 8D:
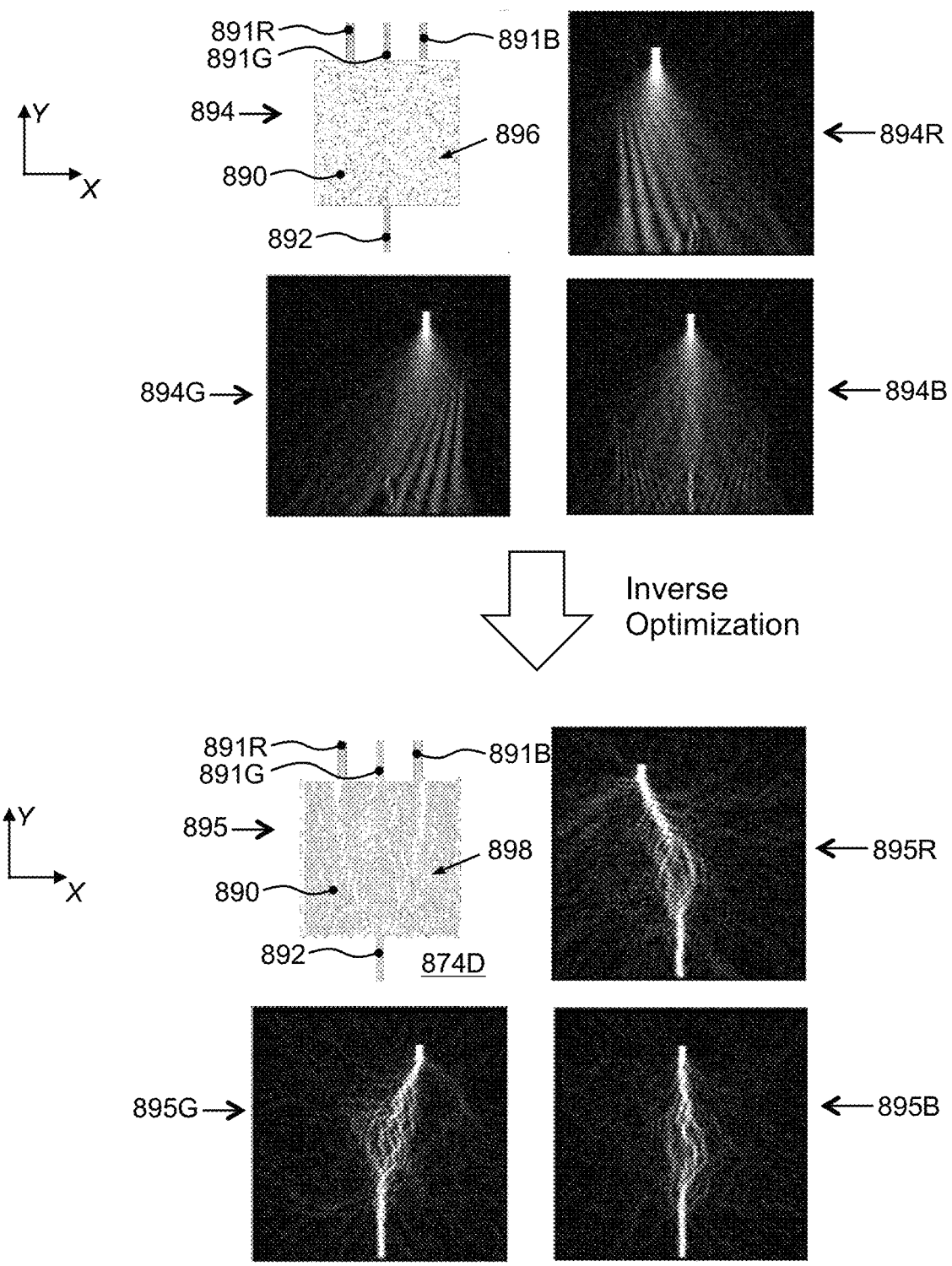
FIG. 8D is a schematic view of a compact multimode coupler for combining light sources of different wavelengths, with inverse optimization of the coupler's cavity.

Referring to FIG. 8D, a combiner element 874D includes a cavity 890, a plurality of input waveguides 891R, 891G, 891B, and an output waveguide 892. Each input waveguide 891R, 891G, 891B optically couples a light source of the red, green, and blue color channel respectively to the cavity 890. The light sources are not shown for brevity. The cavity 890 has a non-uniform spatial distribution of effective dielectric permittivity $\varepsilon(x,y)$. The effective dielectric permittivity $\varepsilon(x,y)$ is determined by a nanostructure including e.g. a series of dots. The nanostructure is being optimized using inverse optimization methods for coupling light emitted by each light source to the output waveguide 892.

The process of inverse optimization of the combiner element 874D is illustrated by comparison of the top views 894, 894R, 894G and 894B to respective bottom views 895, 895R, 895G and 895B in FIG. 8D. The view 894 shows a non-optimized combiner element with a seed nanostructure 896 in the cavity 890. A wave computation results for the light of red, green, and blue color channel are shown in the top 894R, 894G and 894B views respectively, with the light propagation occurring from one of the input waveguides 891R, 891G, 891B to the output waveguide 892. It is seen that the light of red, green, and blue color channels mostly misses the output waveguide 892. Simulation software is then configured to perturb and optimize the seed nanostructure 896 of the cavity 890 and re-propagate the light of the red, green, and blue color channels, arriving at a final nanostructure 898 shown in the view 895. The final nanostructure 898 in the cavity 890 has an optimized non-uniform spatial distribution of the effective dielectric permittivity $\varepsilon(x,y)$, which enables the cavity 890 to propagate the light of the red, green, and blue channels from the input waveguides 891R, 891G, 891B to the output waveguide 892 with high efficiency, as illustrated in bottom views 895R, 895G and 895B, respectively.

Figure 9A:
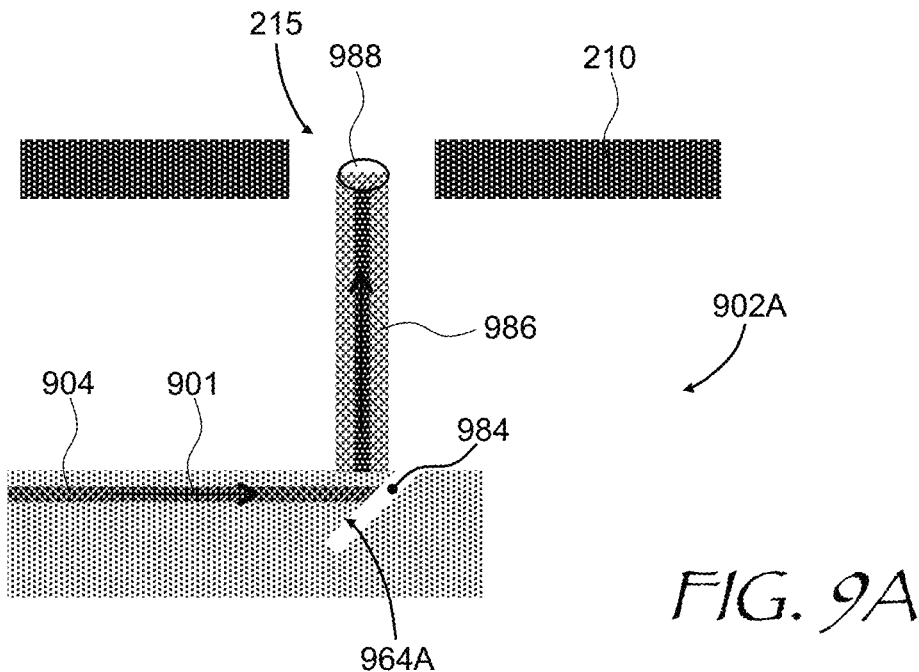
FIG. 9A is a side cross-sectional view of a PIC out-coupler using a straight etched mirror.

Referring to FIG. 9A, a PIC 902A includes a waveguide 904 and a slanted flat turning mirror 964A that out-couples a light beam 901 from the waveguide 904. The turning mirror 964A may be manufactured e.g. by directional etching of the PIC 902, where the turning mirror 964A is merely one of the parallel surfaces of an etched slit-like opening or cutout 984. An auxiliary waveguide 986, e.g. a thin section of an optical fiber or a fiber-like waveguide, may extend from the PIC 902A towards the opening 215 in the first reflector 210 for conveying, i.e. guiding within, the light beam 901 reflected by the turning mirror 964A to the opening 215 in the first reflector 210. The auxiliary waveguide 986 may end with a lens element 988 supported by, or extending from the auxiliary waveguide 986. The lens element 988 facilitates focusing of the light beam 901 through the opening 215.

Figure 9B:
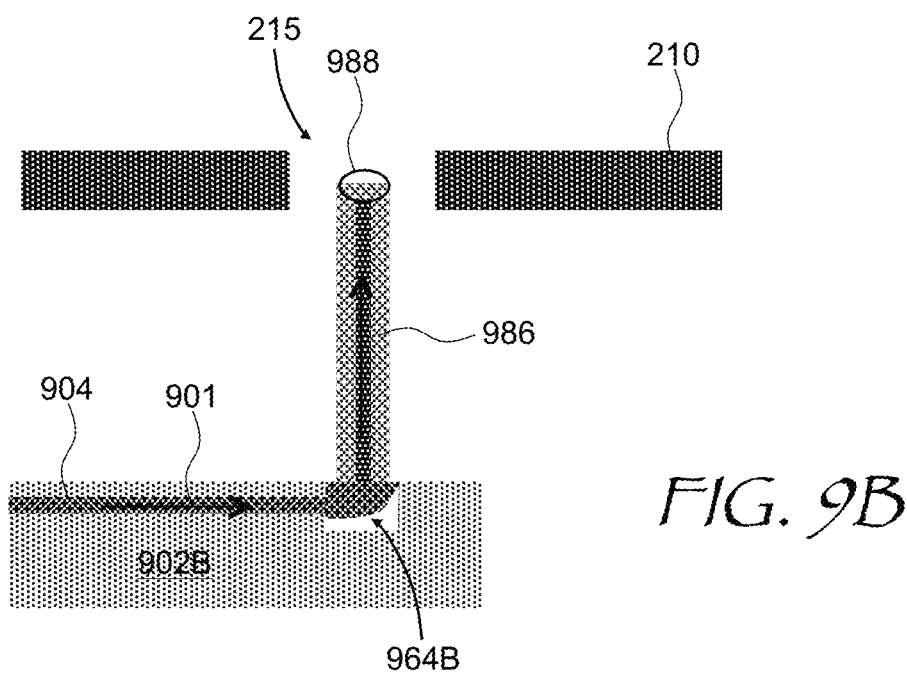
FIG. 9B is a side cross-sectional view of a PIC out-coupler using an off-center concave etched mirror.

Turning to FIG. 9B, a PIC 902B is similar to the PIC 902A of FIG. 9A, only a turning mirror 964B is curved, forming an off-axis concave reflector that focuses the light beam 901 into the auxiliary waveguide 986.

Figure 9C:
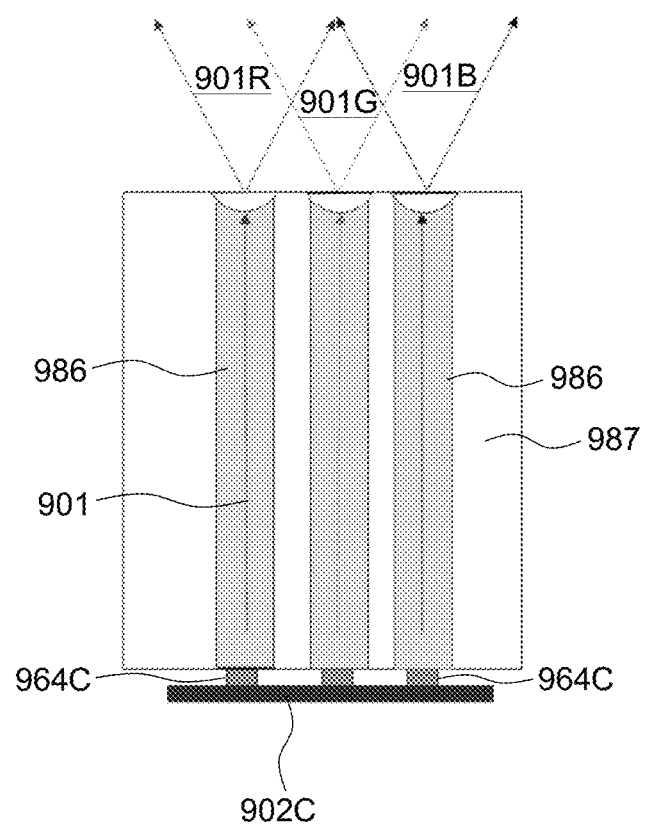
FIG. 9C is a side cross-sectional view of an out-coupler of PIC light based on an array of vertically placed auxiliary waveguides.

Several auxiliary waveguides 986 may be combined to convey different light beams, e.g. from different emitters of a multi-emitter light source. Referring to FIG. 9C for an example, three auxiliary waveguides 986 are optically coupled to three out-couplers 964C, which may be gratings and/or turning mirrors, for out-coupling light of red, green, and blue color channels 901R, 901G, and 901B respectively. The auxiliary waveguides 986 may be formed in a common substrate 987 disposed at a non-parallel angle, e.g. perpendicularly, to the PIC 902C.

Figure 9D:
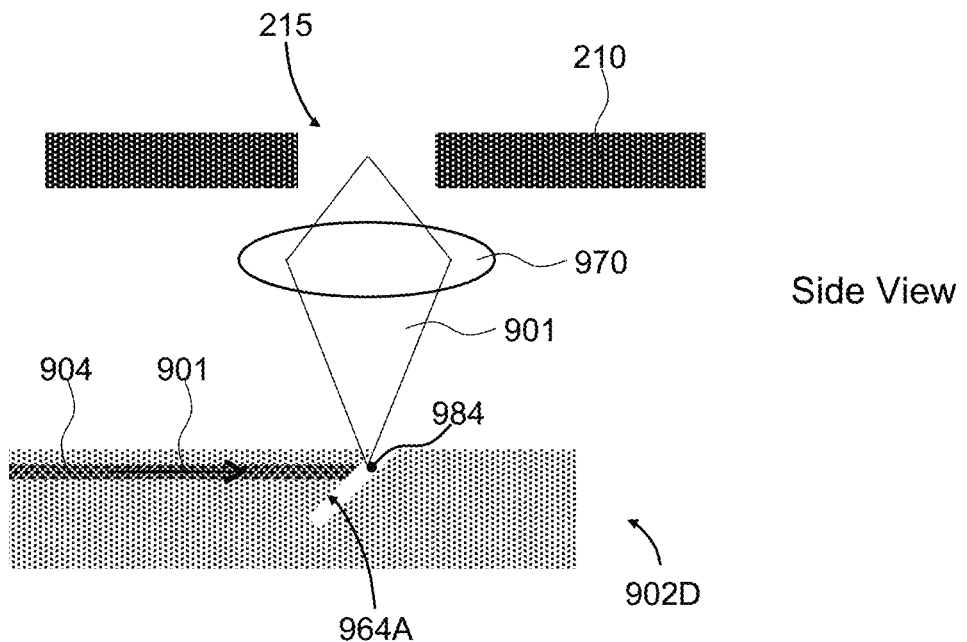
FIG. 9D includes side and frontal view of a PIC out-coupler using a straight etched mirror and a beam forming optic.
Figure 9D:
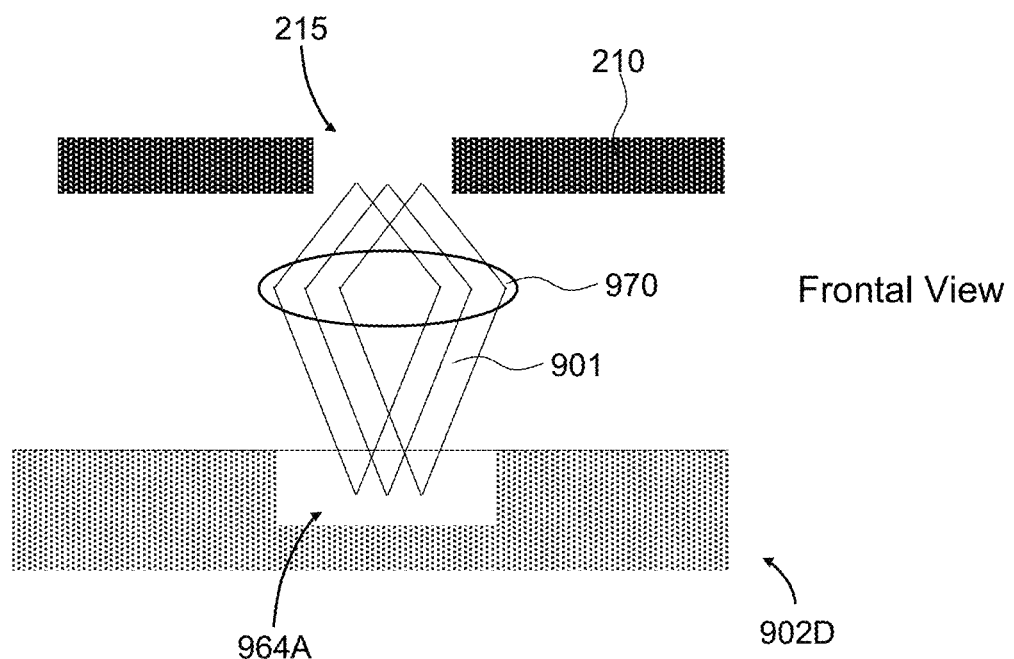

Referring to FIG. 9D, a PIC out-coupler 902D is shown in side and frontal views. The PIC out-coupler 902D of FIG. 9D includes an array of waveguides 904 and the slanted flat turning mirror 964A that out-couples the light beams 901 from the waveguides 904. The out-coupling occurs in upward direction in FIG. 9D. The turning mirror 964A may be manufactured e.g. by directional etching of the PIC 902 across all waveguides 904 of the array; the turning mirror 964A is merely one of the parallel surfaces of an etched slit-like opening or cutout 984. The PIC out-coupler 902D is similar to the PIC 902A of FIG. 9A, but includes a beam forming optic 970 instead of the auxiliary waveguide 986. The forming optic 970 (FIG. 9D) operates as a pupil relay. Specifically, the forming optic 970 conveys the output beams 901 turned by the turning mirror 964A to the opening 215, while refocusing the output beams at the opening 215.

Figure 10:
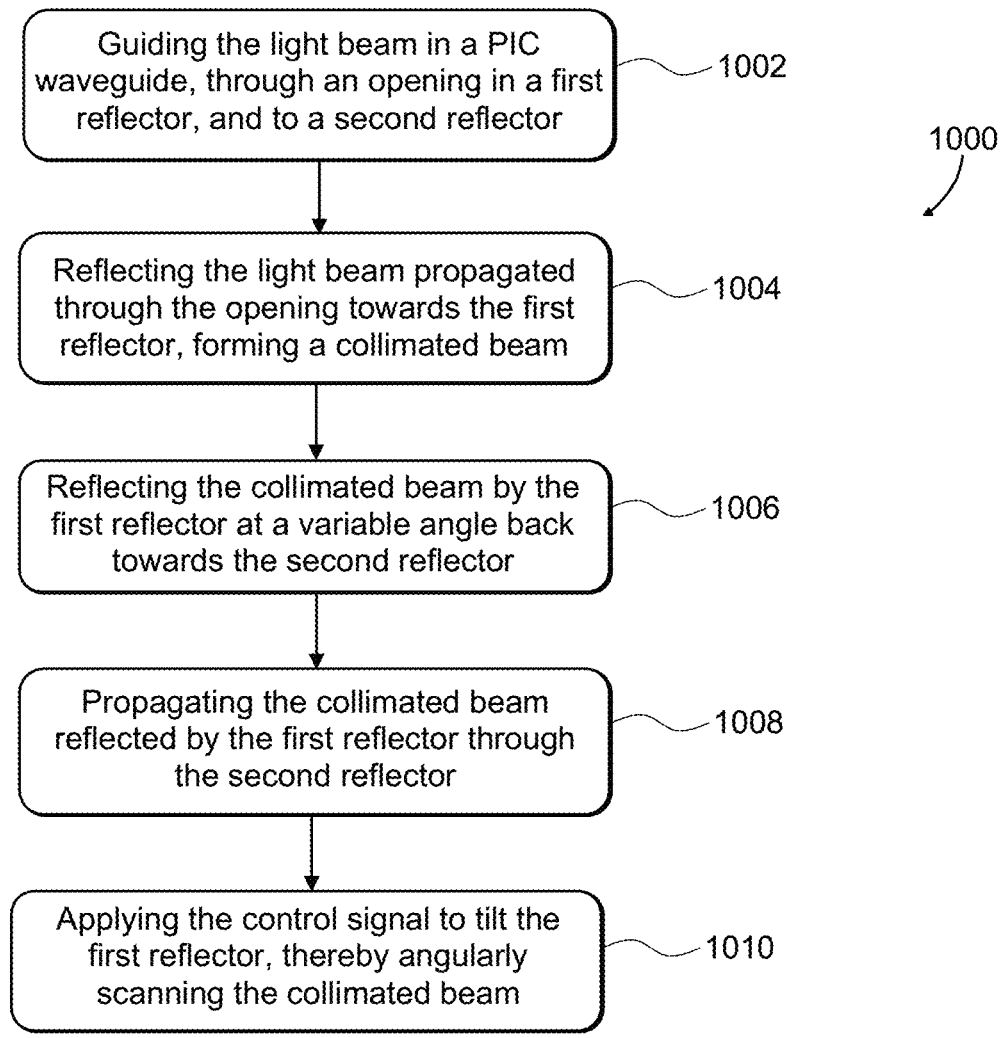
FIG. 10 is a flow chart of a method for scanning a light beam in accordance with this disclosure.

Referring now to FIG. 10 with further reference to FIGS. 2A to 2C and FIG. 4A, a method 1000 for scanning a light beam, e.g. using the beam scanner 200 of FIGS. 2A to 2C, includes guiding (FIG. 10; 1002) the light beam, e.g. the light beam 201, in a waveguide of a PIC, e.g. the waveguide 204 of the PIC 202, through the opening 215 in the first reflector 210, and to the second reflector 220 opposite the first reflector 210. The first reflector 210 is tiltable upon application of a control signal to the first reflector 210. The light beam 201 propagated through the opening 215 towards the first reflector 210 is at least partially reflected (1004), thereby forming the collimated beam 203. The collimated beam 203 is reflected (1006) by the first reflector 210 at a variable angle (depending on the control signal applied) back towards the second reflector 220. At least a portion of the collimated beam 203 reflected by the first reflector 210 is then propagated (1008) through the second reflector 220. The control signal is applied (1010) to the first reflector 210 to tilt the first reflector 210, thereby angularly scanning the collimated beam 205 propagated through the second reflector 220.

In some embodiments, a coupling lens, e.g. the coupling lens 206 in FIG. 2A, is used to couple the light beam 201 guided by the waveguide 204 of the PIC 202 to the opening 215 in the first reflector 210 in step 1002. The second reflector 220 may be polarization-selective e.g. it may include the polarization-selective coating 221 (FIG. 2A) and/or a reflective polarizer 420 (FIG. 4A). The method 1000 may further include converting polarization of the light beam 201 on an optical path between first and second incidences of the light beam 201 onto the second reflector 220 from a first polarization state, at which the light beam 201 is reflected by the second reflector, to a second polarization state, at which the collimated scanned light beam 205 propagates through the second reflector 220. At the first incidence, the diverging light beam 201 is at least partially reflected (1004) from the second reflector 220 or 420; and at the second incidence, the collimated scanned light beam 205 is transmitted (1008) through the second reflector 220 or 420.

Figure 11:
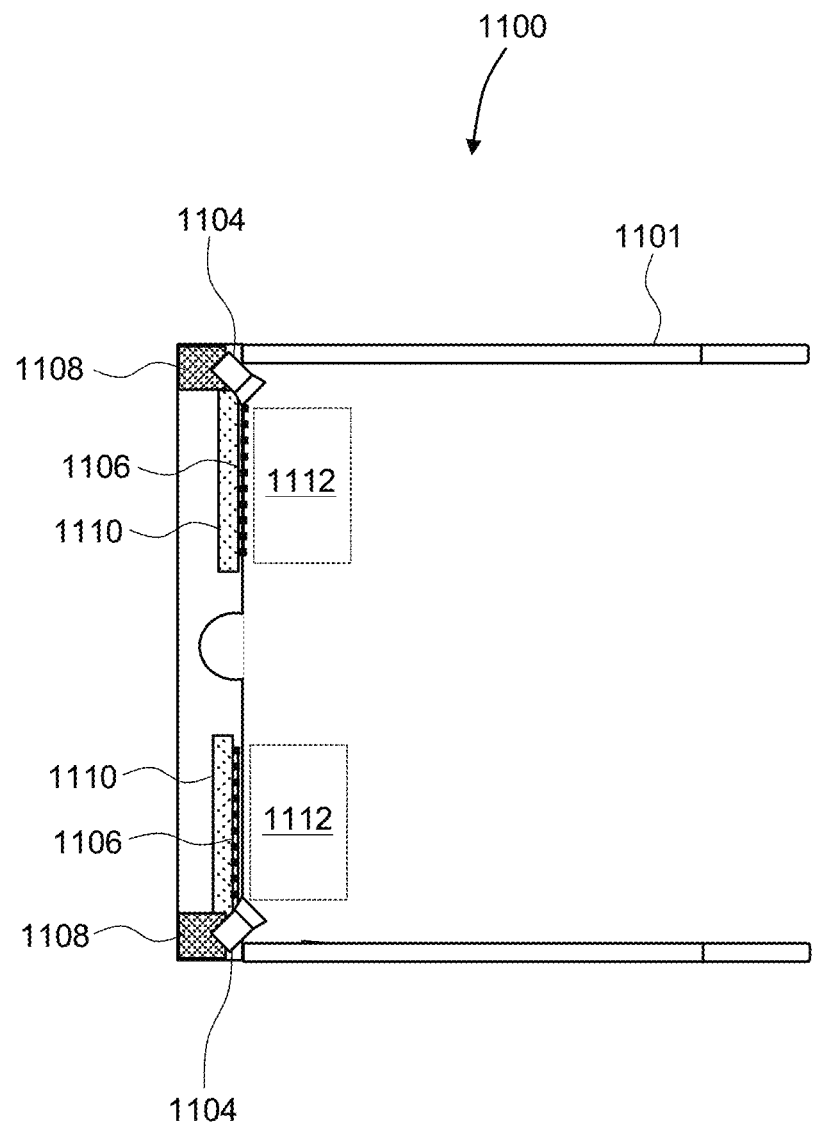
FIG. 11 is a view of an augmented reality (AR) display of this disclosure having a form factor of a pair of eyeglasses.

Turning to FIG. 11, an augmented reality (AR) near-eye display 1100 is an embodiment of the display device 250 of FIG. 2C. The AR near-eye display 1100 includes a frame 1101 having a form factor of a pair of eyeglasses. The frame 1101 supports, for each eye: a projector 1108 including a beam scanner described herein, a pupil-replicating lightguide 1110 optically coupled to the projector 1108, an eye-tracking camera 1104, and a plurality of illuminators 1106. The illuminators 1106 may be supported by the pupil-replicating lightguide 1110 for illuminating an eyebox 1112. The projector 1108 provides a fan of light beams carrying an image in angular domain to be projected into a user's eye. The pupil-replicating lightguide 1110 receives the fan of light beams and provides multiple laterally offset parallel copies of each beam of the fan of light beams, thereby extending the projected image over the eyebox 1112.

Multi-emitter laser sources may be used in the projector 1108. Each emitter of the multi-emitter laser chip may be configured to emit image light at an emission wavelength of a same color channel or a different color channels. The emission wavelengths of different emitters of the same multi-emitter laser chip may occupy a spectral band having the spectral width of the laser source.

In some embodiments, the projector 1108 may include two or more multi-emitter laser chips emitting light at wavelengths of a same color channel or different color channels. For AR applications, the pupil-replicating lightguide 1110 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1104 is to determine position and/or orientation of both eyes of the user. Once the position and orientation of the user's eyes are known, a gaze convergence distance and direction may be determined. The imagery displayed by the projectors 1108 may be adjusted dynamically to account for the user's gaze, for a better fidelity of immersion of the user into the displayed augmented reality scenery, and/or to provide specific functions of interaction with the augmented reality. In operation, the illuminators 1106 illuminate the eyes at the corresponding eyeboxes 1112, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1112.

The function of the eye-tracking camera controllers 1107 is to process images obtained by the eye-tracking cameras 1104 to determine, in real time, the eye gazing directions of both eyes of the user. In some embodiments, the image processing and eye position/orientation determination functions may be performed by a central controller, not shown, of the AR near-eye display 1100. The central controller may also provide control signals to the projectors 1108 to generate the images to be displayed to the user, depending on the determined eye positions, eye orientations, gaze directions, eyes vergence, etc.

Figure 12:
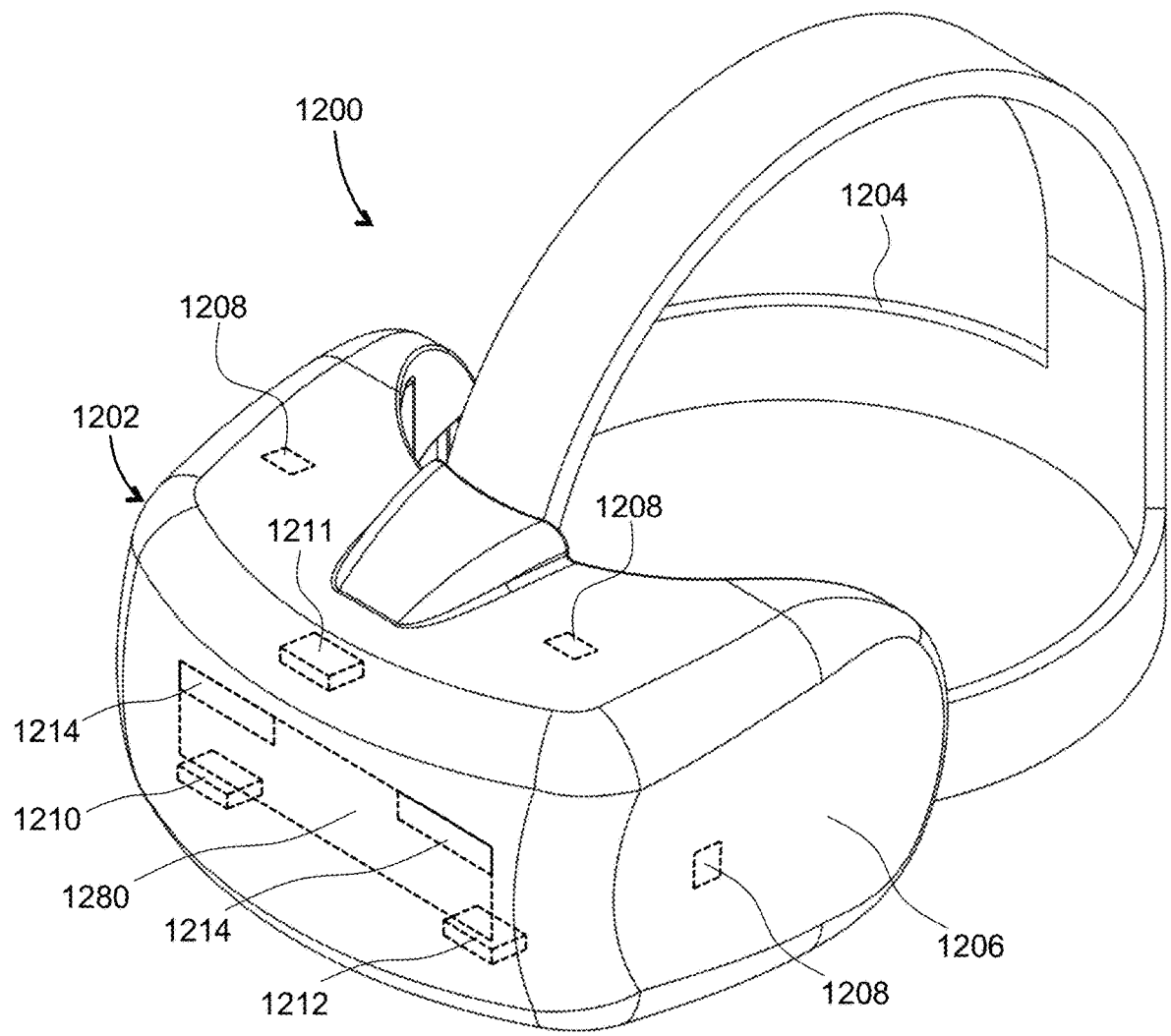
FIG. 12 is a 3D view of a head-mounted display (HMD) of this disclosure.

Turning to FIG. 12, an HMD 1200 is an example of an AR/VR wearable display system. The HMD 1200 is another embodiment of the display device 250 of FIG. 2C. The function of the HMD 1200 is to augment views of a physical, real-world environment with computer-generated imagery, and/or to generate the entirely virtual 3D imagery. The HMD 1200 may include a front body 1202 and a band 1204. The front body 1202 is configured for placement in front of eyes of a user in a reliable and comfortable manner, and the band 1204 may be stretched to secure the front body 1202 on the user's head. A display system 1280 may be disposed in the front body 1202 for presenting AR/VR imagery to the user. Sides 1206 of the front body 1202 may be opaque or transparent.

In some embodiments, the front body 1202 includes locators 1208 and an inertial measurement unit (IMU) 1210 for tracking acceleration of the HMD 1200, and position sensors 1212 for tracking position of the HMD 1200. The IMU 1210 is an electronic device that generates data indicating a position of the HMD 1200 based on measurement signals received from one or more of position sensors 1212, which generate one or more measurement signals in response to motion of the HMD 1200. Examples of position sensors 1212 include: one or more accelerometers, one or more gyroscopes, one or more magnetometers, another suitable type of sensor that detects motion, a type of sensor used for error correction of the IMU 1210, or some combination thereof. The position sensors 1212 may be located external to the IMU 1210, internal to the IMU 1210, or some combination thereof.

The locators 1208 are traced by an external imaging device of a virtual reality system, such that the virtual reality system can track the location and orientation of the entire HMD 1200. Information generated by the IMU 1210 and the position sensors 1212 may be compared with the position and orientation obtained by tracking the locators 1208, for improved tracking accuracy of position and orientation of the HMD 1200. Accurate position and orientation is important for presenting appropriate virtual scenery to the user as the latter moves and turns in 3D space.

The HMD 1200 may further include a depth camera assembly (DCA) 1211, which captures data describing depth information of a local area surrounding some or all of the HMD 1200. To that end, the DCA 1211 may include a laser radar (LIDAR), or a similar device. The depth information may be compared with the information from the IMU 1210, for better accuracy of determination of position and orientation of the HMD 1200 in 3D space.

The HMD 1200 may further include an eye tracking system 1214 for determining orientation and position of user's eyes in real time. The obtained position and orientation of the eyes also allows the HMD 1200 to determine the gaze direction of the user and to adjust the image generated by the display system 1280 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A beam scanner comprising:
 a photonic integrated circuit (PIC) comprising a first waveguide for guiding a first light beam; and
 first and second opposed reflectors;
 wherein the first reflector is tiltable upon application of a control signal and has an opening therein for receiving the first light beam out-coupled from the first waveguide; and
 wherein the second reflector is configured to at least partially reflect the first light beam back towards the first reflector after the first light beam propagated through the opening in the first reflector, thereby forming a first collimated beam to be reflected by the first reflector at a variable angle towards the second reflector, wherein the second reflector is configured to propagate therethrough at least a portion of the first collimated beam reflected by the first reflector.

2. The beam scanner of claim 1, wherein the first reflector comprises a microelectromechanical system (MEMS) tiltable reflector.

3. The beam scanner of claim 1, further comprising a quarter-wave plate (QWP) in an optical path between the first and second reflectors for converting a first linear polarization of the first light beam into a second, orthogonal linear polarization of the first collimated beam, wherein the second reflector is polarization-selective.

4. The beam scanner of claim 1, further comprising a coupling lens in an optical path between the PIC and the opening in the first reflector for focusing the first light beam through the opening.

5. The beam scanner of claim 1, wherein the PIC comprises an out-coupler for out-coupling the first light beam from the waveguide.

6. The beam scanner of claim 5, wherein the out-coupler comprises a turning mirror for redirecting the first light beam out of a plane of the PIC.

7. The beam scanner of claim 6, wherein the turning mirror is concave for focusing the light beam through the opening in the first reflector.

8. The beam scanner of claim 6, further comprising an auxiliary waveguide extending from the PIC towards the opening in the first reflector for conveying the first light beam reflected by the turning mirror to the opening in the first reflector.

9. The beam scanner of claim 1, wherein the PIC further comprises a second waveguide for guiding a second light beam, wherein the second light beam out-coupled from the second waveguide is coupled into the opening in the first reflector;

wherein the second reflector is configured to at least partially reflect the second light beam back towards the first reflector after the second light beam propagated through the opening in the first reflector, thereby forming a second collimated beam to be reflected by the first reflector at a variable angle towards the second reflector, wherein the second reflector is configured to propagate therethrough at least a portion of the second collimated beam reflected by the first reflector.

10. The beam scanner of claim 1, wherein the PIC further comprises a combiner element for optically coupling a plurality of light sources at different wavelengths into the first waveguide.

11. The beam scanner of claim 10, wherein the combiner element comprises a multimode interference (MMI) coupler for combining light beams emitted by the plurality of light sources.

12. The beam scanner of claim 10, wherein the combiner element comprises:
   a plurality of ring resonators, each ring resonator of the plurality of ring resonators optically coupling a light source of the plurality of light sources to the waveguide; or
   a plurality of directional couplers, each directional coupler of the plurality of directional couplers optically coupling a particular light source of the plurality of light sources to the waveguide.

13. The beam scanner of claim 10, wherein the combiner element comprises a cavity having coupled thereto a plurality of input waveguides and an output waveguide, each input waveguide of the plurality of input waveguides optically coupling a light source of the plurality of light sources to the cavity;
   wherein the cavity has a nanostructure providing a non-uniform spatial distribution of effective dielectric permittivity optimized for coupling light emitted by each light source to the output waveguide of the combiner element.

14. A display device comprising:
   a first light source for emitting a first light beam;
   a photonic integrated circuit (PIC) coupled to the first light source, the PIC comprising a waveguide for guiding the first light beam;
   first and second opposed reflectors; and
   a pupil-replicating lightguide;
   wherein the first reflector is tiltable upon application of a control signal and has an opening therein for receiving the first light beam out-coupled from the waveguide;
   wherein the second reflector is configured to at least partially reflect the first light beam back towards the first reflector after the first light beam propagated through the opening in the first reflector, thereby forming a collimated beam to be reflected by the first reflector at a variable angle towards the second reflector, wherein the second reflector is configured to propagate therethrough at least a portion of the collimated beam reflected by the first reflector; and
   wherein the pupil-replicating lightguide is configured to in-couple the collimated beam propagated through the second reflector, and to out-couple, at an out-coupling angle, portions of the collimated beam, wherein the portions are offset along a length dimension of an eyebox of the display device.

15. The display device of claim 14, wherein the pupil-replicating lightguide comprises an in-coupling grating for in-coupling the collimated beam, and an out-coupling grating for out-coupling the portions of the collimated beam along the length dimension of the eyebox.

16. The display device of claim 14, further comprising a controller operably coupled to the first light source and the first reflector and configured to control a brightness of the first light source in coordination with applying the control signal to the first reflector for scanning the collimated beam portions to form an image in angular domain at the eyebox.

17. The display device of claim 14, further comprising a second light source for emitting a second light beam at a different wavelength than the first light beam, the PIC further comprising a combiner element for optically coupling the first and second light beams into the first waveguide.

18. A method for scanning a light beam, the method comprising:
   guiding the light beam in a waveguide of a photonic integrated circuit (PIC), through an opening in a first reflector, and to a second reflector opposite the first reflector, wherein the first reflector is tiltable upon application of a control signal;
   at least partially reflecting the light beam propagated through the opening towards the first reflector, thereby forming a collimated beam;
   reflecting the collimated beam by the first reflector at a variable angle back towards the second reflector;
   propagating at least a portion of the collimated beam reflected by the first reflector through the second reflector; and
   applying the control signal to the first reflector to tilt the first reflector, thereby angularly scanning the collimated beam propagated through the second reflector.

19. The method of claim 18, further comprising using a coupling lens to couple the light beam guided by the waveguide of the PIC to the opening in the first reflector.

20. The method of claim 18, wherein the second reflector is polarization-selective, the method further comprising converting polarization of the light beam on an optical path between first and second incidences of the light beam onto the second reflector from a first polarization state, at which the light beam is reflected by the second reflector, to a second polarization state, at which the light beam is propagated through the second reflector.

* * * * *